3,142,575
PREPARATION OF MICROBIAL MILK-ACIDULAT-
ING CULTURES FOR CHEESE-MAKING
Edward J. Tynan, Gales Ferry, Conn., and Myron W. Hales, Glendale, Wis., assignors to Chas. Pfizer & Co., Inc., New York, N.Y., a corporation of Delaware
No Drawing. Filed Dec. 4, 1962, Ser. No. 242,065
4 Claims. (Cl. 99—116)

This invention relates to the isolation of microorganisms. More specifically, it contemplates processes for the isolation of strains of microorganisms, for their classification with respect to the rates at which they promote the formation of acids, and for their recombination into cultures which are particularly suited for use in the production of cheese, cottage cheese and buttermilk.

In the manufacture of cheese, milk is coagulated, that is, the solids present are formed into a compact curd. Next, the curd is separated from the predominantly aqueous non-solid portion, whey, then the curd is salted and is cured to develop the flavor and texture characteristic of the cheese being produced. The instant invention is concerned with the step immediately prior to curdling, during which acidity of the milk increases, and with the curdling step.

When carrying out these steps, the cheesemaker adds a "starter." The starter is comprised of milk containing a high concentration of a number of strains of living microorganisms, and is added in an amount which corresponds to about 1% by weight of the milk to be treated. A primary function of the starter is to acidulate the milk, that is, to promote the development of acidity therein. As a result of this, pH values are reached at which separation of solid matter is possible. For example, as the acidity increases, the principal protein, casein, which is colloidally suspended in milk as its calcium salt, will go out of solution and will accumulate in large lumps of curd or as a continuous mass.

Acidity is developed by conversion of lactose in the milk to lactic acid; this conversion results from chemical changes promoted by the organisms present in the starter. Among the organisms especially important in the preparation of cheese are bacteria such as *Streptococcus lactis* and *S. cremoris;* also important are a number of associated microorganisms such as *Leuconostoc dextranicum, L. citrovorum*, and the like.

In addition to its function in developing the necessary acidity, the starter profoundly influences the nature, flavor and texture of the cheese ultimately obtained. As a result of this, minor changes in the constitution of the starter such as, for example, accidental introduction of undesirable strains (contamination), loss of activity, and rapid multiplication of one or more strains at the expense of others can have a serious effect on the value of the cheese. Among such serious effects may be mentioned, for example, the development of bitter flavors, sharp, uncharacteristic odors, gas pockets and undesirable textures.

The art has recognized the magnitude of these effects and cheesemakers have developed techniques in attempts to minimize the resulting problems. For example, the modern cheese producer transfers and grows his cultures under aseptic conditions so that wild strains are, for the most part, avoided and, in addition, in recognition of the tendency for some strains in his culture to grow at the expense of others, he has devised ways of separating them into two or more multi-strain groups.

Although such expediences are useful to maintain control of cheese manufacturing processes, there are many instances when cheese made from batches of milk of the order of several thousand pounds in weight is of inferior quality because of failure by the starter to perform in its expected fashion. These failures make it highly desirable to provide uniform and reproducible methods for the preparation of starters. In addition, once a culture has been changed by development and growth of an undesirable strain by contamination or by mutation, instead of discarding it, it is desirable to be able to purify it to the extent that the undesirable strain is eliminated and the desirable strains maintained. This upgrading of a contaminated starter is one of the objects of the instant invention.

It has now been found, by the practice of the process of the instant invention, that it is possible to provide starter cultures which minimize difficulties responsible for unacceptable cheeses. Furthermore, it is unexpectedly found that instead of the multitude of strains of microorganisms comprising cultures employed in the art, only a few strains are required in a particularly effective new culture of the instant invention. In addition it is surprising to find that the said new culture may be maintained as one group or, alternatively, can be broken into only two groups of strains in order to avoid the tendency for some to grow at the expense of others; as is mentioned hereinbefore, more groups have sometimes been required to avoid this problem in the past. As a consequence of the use only one or two cultures instead of numerous cultures, the possibility of contamination of the culture by wild strains in the cheese factory is markedly decreased. Furthermore, should a valuable starter culture be contaminated by a wild strain, or in some manner become seriously deficient in activity, the process of the instant invention provides a method whereby it may be upgraded, or reworked, to the extent that the desirable characteristics are again obtained.

It is accordingly a principal object of the instant invention to provide a means to prepare improved cheese starter cultures.

It is a further object of the instant invention to provide a means to improve cheesemaking to minimize loss of the product through development of off-flavors, poor texture, bad odor and gas pockets.

Still another object of the instant invention is to provide a culture for starting cheese, the strains of which may be conveniently maintained in one group, or divided into only two stable groups, thus serving to decrease the possibility of introducing wild, deleterious microbial strains during transfer operations.

A further object of the instant invention is to provide a means for culture upgrading, that is, to free contaminated cultures of undesirable strains of microorganisms, which tend to produce poor cheese.

These and other objects obvious to those skilled in the art may be readily achieved by application of the process of the instant invention which, in essence, comprises: Plating out a multi-strain cheese starter culture, selecting from the strains separated thereby at least one rapid rate acid-former, at least one moderate rate acid-former, at least one slow rate acid-former and at least one non acid-former, inoculating a nutrient medium with the said selected strains, incubating said inoculated medium until a peak state of viability is reached, and drying the medium to isolate the said improved culture.

The term drying as used herein and in the appended claims contemplates the usual techniques employed in the art to remove the volatile elements comprising the media in which the microorganisms are grown. Drying is widely used in the art as a method of preserving bacterial cultures and, while removal of the volatile elements in a high vacuum at normal room temperatures (20–25° C.) is a convenient method for drying, it is preferred, because of a tendency to diminish mortality, to dry the cultures in vacuo from the frozen state. This preferred freeze drying process is known in the art as lyophilization.

In addition to the process for preparing the improved cultures of this invention, there are also contemplated processes for their employment in the making of cheese.

Furthermore, the instant invention contemplates an embodiment wherein the selected strains are separated into two groups, two batches of medium are each inoculated with one of the said groups, the said inoculated media are fermented until a peak state of viability is reached, the said media are freeze-dried to isolate the culture groups.

As an additional embodiment, the instant invention also contemplates the use of a starter comprised of a combined propagated culture consisting of isolates ATCC 14874 and ATCC 14875 and milk.

As a further embodiment, there is contemplated a process for increasing the quality of cheese made from poor starter cultures which comprises plating out the said culture, isolating pure strains obtained by said plating, selecting at least one rapid rate acid-former, at least one moderate acid-former, at least one slow rate acid-former and at least one non acid-former, inoculating a nutrient medium with the said selected strains, incubating said inoculated medium until a peak state of viability is reached, drying the medium to isolate the said improved culture, adding the said culture to milk and using the starter obtained thereby to make the improved cheese.

The multi-strain cultures which are used as sources for the individual strains employed can be obtained from a number of commercial sources well known to those skilled in the art. However, for the convenience of the public, applicants herein have deposited in the collection of the American Type Culture Collection, Washington D.C., three mixed cultures, designated respectively, ATCC 14871; ATCC 14872 and ATCC 14873, which cultures will serve as starting materials for the practice of the instant invention. These said cultures comprise commercially-available cheese starter cultures, each of which contains many morphologically-distinct strains. The cultures comprise, in the main, lactic acid-producing Streptococci, some of which are of named species and some of which have not been named to date, together with certain of the associated microorganisms mentioned hereinbefore.

To separate the strains, each culture is transferred to an agar plate by well known spreading techniques and the plate is incubated until well-formed colonies of growing microorganisms can be observed. Then, preferably with the aid of magnification, a number of the individual colonies are aseptically transferred to separate batches of nutrient media and the strains thus isolated are propagated. The nutrient media can be any synthetic or natural medium suitable for growth; it is preferred and convenient to use a sterile reconstituted skim milk solids medium. When a peak state of viability is reached it is convenient to preserve the strain by freeze-drying the medium and to store the strain as the solid residue, the so-called "lyophile." Although neither critical, nor necessary to the instant process, the best microbiological technique requires at least about three series transfers during the propagation of the pure strains; it is suitable to use only one transfer, however.

To classify the strains in terms of their ability to effect the rate of acid formation, they are grown in a reconstituted milk medium under standardized conditions of time and temperature and a lactic acid titer is determined. The technique, which will be exemplified in detail hereinafter, comprises transferring cells of the viable strain to be classified into a flask containing a quantity, conveniently about 100 ml., of a sterile medium comprising dry skim milk solids reconstituted with distilled water. Although the concentration is not critical, it is preferred to use from about 9% to about 10% by weight of milk solids.

The inoculated medium is incubated for 16 hours at 21° C., in a quiescent state, then is treated with phenolphthalein indicator and is titrated with 0.1 N sodium hydroxide solution to determine the percent of acid, calculated as lactic acid, present.

Of course, it is equally feasible to determine the amount of acid developed by measuring the pH of the resulting medium.

This procedure is repeated for all members of the strains isolated as described above and the strains are then grouped with respect to the amount of lactic produced under these conditions. Those strains which do not cause the production of significant amounts of lactic acid, i.e., do not cause an increase in the normal 0.17–0.20 lactic titer of sweet milk, are grouped with the non-acid formers contemplated by the appended claims. The fast acid-formers have a lactic titer of from about 0.70 to about 0.85; the moderate acid-formers have a titer of from about 0.40 to about 0.69; and the slow acid-formers have a titer of from about 0.20 to about 0.39; as previously stated, sweet milk itself, the control, has a titer of from about 0.17 to about 0.20.

It is also possible to classify the strains, with respect to acid forming rate, by observing the rate at which they curdle milk. As will be described in the examples, the fast acid-formers always form curds in 72 hours; the intermediate acid-formers form curds in substantially all cases; the slow acid formers do not form curds in substantially all cases and the non-acid formers never do. It is preferred, however, to rely on the quantitative titers rather than on curd formation as the criterion for selection.

After the strains have been isolated and classified, the cheese starter culture may be prepared according to the process of this invention by selecting at least one strain from each of the four groups, fast-, moderate-, and slow acid-formers and non acid-formers and growing them to a peak state of viability. It is preferable, since it minimizes the effect of selecting strains with low phage-resistance, to select about three strains from each group. However, the process need not be limited specifically to three since more than three may be used with equal effectiveness, although no particular advantage is derived in so-doing. It is believed to be essential, however, to select at least one strain from each of the four groups for use in the culture to be prepared.

After the strains have been isolated, classified and selected, they are grown in a nutrient medium to a peak state of viability and are dried and stored for later use as starter cultures. This production procedure, which will be exemplified in detail hereinafter, comprises inoculating a sterile milk solids medium of a convenient concentration, preferably from about 9% to about 14% by weight of milk solids in water, and incubating for a convenient time, preferably for from about 8 to about 24 hours, at about 21° C. Although not necessary, it is a preferred practice to transfer and inoculate through 3 series of pure cultures. The final pure strains are then combined conveniently in a flask of the same medium. Here it is convenient to use from about 0.1 to about 1 volume of each strain per final volume. This mixed culture is then used to inoculate a milk solids medium, conveniently from about 9 to about 14% by weight of milk solids at a rate of about 1% of inoculum based on the growth medium. This inoculum is then incubated, at about 20–21° C., under quiescent conditions, and periodic observations of curd formation and determinations of pH and lactic acid percentage are made. When the broth has reached a pH of from about 4.3 to about 4.6 and the titratable acid has reached from about 0.8% to about 1.3%, no appreciable further increases in acidity will generally occur, no further visual changes are observed and a peak state of viability has been reached. This usually requires from about 12 hours to about 24 hours. The suspension is freeze-dried and the dry, solid residue from freeze drying is preferably stored in evacuated, sealed tubes until it is ready for use as a starter culture.

Since, as has been mentioned hereinbefore, differences in the reproduction rates among some strains make it desirable to propagate and to store them in separate groups, a preferred embodiment of the present invention is to produce the culture in two groups. In so doing, the strains which tend to be incompatible, i.e., which tend to grow at the expense of others, may be kept separate until used. Such an embodiment will be exemplified in detail hereinafter and is illustrated in the following diagram:

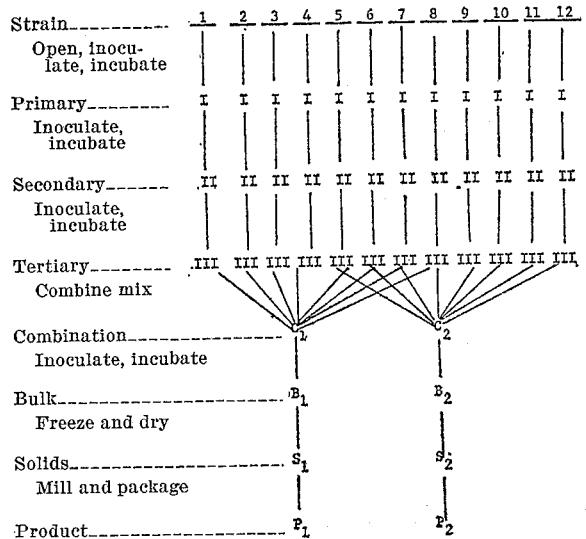

Lyophiles of the selected strains are opened and used to inoculate a sterile 10% milk solids medium, Primary I. This is incubated at about 21° C. for about 24 hours, or until good growth is obtained then is used to inoculate a fresh portion of the same medium, Secondary II. After incubation of Secondary II at 21° C. for 24 hours, it is used to inoculate Tertiary III, a third series of fresh sterile medium of the same composition. After incubation at 21° C. for 24 hours, each III is pooled by transfer in a predetermined manner to the combinations, $C_1$ and $C_2$. These are flasks of sterile milk which are well mixed then used to inoculate the sterile bulk propagation medium, preferably from about 9% to about 14% skim milk solids dissolved in water. The individual bulks are incubated at about 21° C. for from about 14 to about 24 hours then are freeze dried and the amorphous solids are milled and packaged. This procedure, which is exemplified in detail hereinafter, is employed in preparing the lyophilized milled cultures designated ATCC 14874 and ATCC 14875.

Of course, as is obvious, this embodiment may be modified to split the strains into three and even more groups. While such embodiments may be desirable with cultures containing a multitude of strains, it has been found that two groups usually are sufficient when only about 12 strains are used.

In the improved process of the instant invention, as applied to making Cheddar cheese, the standard techniques used in the cheesemaking art may be employed substituting for the commercially-available, multi-strain starter cultures usually employed, a substantially equivalent amount of a culture made by the process of this invention and, preferably, the new culture of this invention, ATCC 14874 and ATCC 14875, combined and propagated. It is not necessary to change any of the other conditions for making cheese when the new cultures are used. The cheese obtained from the use of the improved process of the instant invention is fully equivalent in properties to that obtained when commercial multi-strain cultures are used.

The use of the new culture, ATCC 14874–ATCC 14875, in the production of Cheddar cheese is exemplified in detail hereinafter. This procedure is based on commonly employed American cheesemaking techniques. It is to be understood, however, that the instant invention contemplates improvements in the milk acidulating and milk curdling steps common to the preparation of cottage cheese, buttermilk and all other cheeses, hard and soft, wherein commercial starters have heretofor been used. Among the said other cheeses may be mentioned, for example, brick, Camembert-type, cottage, cream, Edam-type, Gouda, hand, Limburger, Neufchatel-type, Roquefort-type, Sapsago-type, Trappist-type, and the like.

The quality of the cheeses made by the improved processes of the instant invention is easily determined by taking samples at intervals during curing and evaluating them for texture, firmness, gas formation, flavor and color development. No evidence of undesirable protease activity is observed in cheeses made with the new cultures. In Cheddar cheeses, the curd remains firm, shows no tendency to redissolve in whey, and is fully equivalent to that prepared with commercial, multi-strain lactic acid starters. Furthermore, during curing desirable flavor and texture development is not accompanied by development of off-flavors, bitterness or excessive curd breakdown; this period usually extends from several months to a year or more.

The following examples are illustrative of the processes of the instant invention. It is to be understood that they define ways in which the processes can be carried out but are not to be construed as limiting in any manner.

*Example I*

A commercial multi-strain cheese starter culture, deposited in the American Type Culture Collection, Washington, D.C., ATCC No. 14873, is suspended in distilled water and aliquots of the mixed culture are spread on the surfaces of sterile solidified beef lactose agar (Difco Laboratories, Detroit, Michigan), and on sterile Triple "S" media in sterile petri dishes. The Triple "S" medium has the following composition:

| | |
|---|---|
| Tryptone _____g__ | 20 |
| Yeast extract _____g__ | 5 |
| Gelatine _____g__ | 2.5 |
| Dextrose _____g__ | 5 |
| Lactose _____g__ | 5 |
| Sucrose _____g__ | 5 |
| Sodium chloride _____g__ | 4 |
| Sodium acetate _____g__ | 1.5 |
| Distilled water, q.s. _____ml__ | 1000 |

The plates are incubated at 21° C. for 7 days during which time many well-separated colonies with different growth habits are observed to form. Eighteen single colonies, which appear to be morphologically distinct, are then individually transferred, under aseptic conditions, on the point of a sterile culture needle to tubes containing 10 ml. of a sterile culture medium of the following composition:

| | |
|---|---|
| Powdered skim milk _____grams__ | 90 |
| Distilled water, q.s. _____ml__ | 1000 |

The inoculated tubes are incubated at 21° C., for 72 hours, whereupon there are obtained single pure cultures comprising the selected individual strains originally present in the starter. The strains are isolated by freezing the cultures and desiccating them under a high vacuum and are maintained as lyophiles in a sealed, evacuated tube at 5° C.

Each strain is then classified with respect to the rate at which it promotes acid formation. Each lyophile is opened and is transferred to 100 ml. of a sterile 9% reconstituted skim milk medium of the preceding composition. The eighteen flasks are incubated at 21° C. for 24 hours and then 1 ml. from each is used to inoculate eighteen new bottles of sterile 9% milk medium; after the new series has been incubated for 24 hours at 21° C., one ml. of each is used to inoculate a third series of eighteen bottles each containing 100 ml. of sterile 9% milk medium. After incubating for 18 hours at 21° C., the formation of curds is noted and approximately 20 ml. of suspension is aseptically removed from each, is weighed, is titrated with 0.1 N sodium hydroxide solution using phenolphthalein indicator and the acidities, expressed as percent lactic acid, are determined.

The expression employed is:

Percent of free acid (as lactic)
$= \dfrac{\text{Vol. of NaOH (ml.)} \times \text{Norm. of NaOH} \times 0.09008 \times 100}{\text{Sample weight (g.)}}$ The following data are obtained:

| Strain No. | Colony Morphology[1] | 72 hr. Curd Formation | Titer,[2] Percent Acid, as Lactic | Acid-Former Designation |
|---|---|---|---|---|
| C-1 | Small, glistening | No curd | 0.22 | Non. |
| C-2 | Large, glistening | Slight Curd | 0.34 | Slow. |
| C-3 | Small, raised | Curd | 0.71 | Fast. |
| C-4 | Dull, flat | No curd | 0.23 | Non. |
| C-5 | Flat, dull; circular border | ----do---- | 0.3 | Slow. |
| C-6 | Large, glistening | Slight curd | 0.38 | Do. |
| C-7 | Flat, dull; circular border | No curd | | |
| C-8 | Raised, glistening | Curd | 0.72 | Fast. |
| C-9 | Flat, dull | ----do---- | 0.81 | Do. |
| C-10 | Flat, dull; circular border | No curd | 0.21 | Non. |
| C-11 | Large, glistening | ----do---- | 0.33 | Slow. |
| C-12 | Large, raised, glistening | Slight curd | 0.38 | Moderate. |
| C-13 | ----do---- | ----do---- | 0.34 | Slow. |
| C-14 | ----do---- | No curd | 0.38 | Moderate. |
| C-15 | Fairly large, flat, dull | Curd | 0.83 | Slow. Fast. |
| C-16 | ----do---- | ----do---- | 0.74 | Do. |
| C-17 | Small, raised; with slight border | ----do---- | 0.79 | Do. |
| C-18 | ----do---- | ----do---- | 0.73 | Do. |

[1] Strains 1-11, incl., isolated on Triple "S"; medium; strains; 12-23, incl., isolated on beef lactose agar medium.
[2] Titer of sterile medium (control), 0.19% acid, as lactic.

The procedure is repeated substituting a second commercial starter culture, deposited and designated ATCC 14871, for the first culture. After isolation of eighteen single colonies and propagation thereof, observations of curd formation and determination of lactic acid formation rates are made. The following data are obtained:

| Strain No. | Colony Morphology[1] | 72 hr. Curd Formation | Titer,[1] Percent Acid, as Lactic | Acid-Former Designation |
|---|---|---|---|---|
| A-1 | Large, flat, dull, etched | Curd | 0.34 | Slow. |
| A-2 | Smaller, raised, glistening | ----do---- | 0.71 | Fast. |
| A-3 | Large, flat, dull etched | ----do---- | 0.35 | Slow. |
| A-4 | Smaller, raised, glistening | ----do---- | 0.73 | Fast. |
| A-5 | Very small, glistening | No curd | 0.21 | Non. |
| A-6 | ----do---- | ----do---- | 0.22 | Non. |
| A-7 | ----do---- | ----do---- | 0.21 | Non. |
| A-8 | Intermediate size, raised, glistening | Curd | 0.73 | Fast. |
| A-9 | ----do---- | ----do---- | 0.73 | Do. |
| A-10 | ----do---- | No curd | 0.37 | Slow. |
| A-11 | Large, flat, dull etched | Curd | 0.51 | Moderate. |
| A-12 | ----do---- | ----do---- | 0.41 | Do. |
| A-13 | ----do---- | ----do---- | 0.36 | Slow. |
| A-14 | Large, raised, glistening | No curd | 0.34 | Do. |
| A-15 | Large, flat, slightly glistening | Curd | 0.43 | Moderate. |
| A-16 | Very small | No curd | 0.25 | Non. |
| A-17 | Small, raised | Curd | 0.78 | Fast. |
| A-18 | Raised, glistening | ----do---- | 0.81 | Do. |

[1] In contrast to 18 hr. C series, 16 hr. incubations made are before titration.

The procedure is repeated substituting a third commercial starter culture, deposited and designated ATCC 14872, for the first culture. After isolation of twenty single colonies and propagation thereof, observations of curd formation and determination of lactic acid formation rates are made. The following data are obtained:

| Strain No. | Colony Morphology[1] | 72 hr. Curd Formation | Titer,[1] Percent Acid, as Lactic | Acid-Former Designation |
|---|---|---|---|---|
| B-1 | Large, raised, slight glistening | Curd | 0.35 | Slow. |
| B-2 | Slightly smaller, dull | ----do---- | 0.31 | Do. |
| B-3 | ----do---- | No curd | 0.35 | Do. |
| B-4 | Large raised, slight glistening | Curd | 0.68 | Moderate. |
| B-5 | Small, raised | ----do---- | 0.79 | Fast. |
| B-6 | Large, raised, glistening | ----do---- | 0.61 | Moderate. |
| B-7 | Flat, dull, milky | ----do---- | 0.34 | Slow. |
| B-8 | Flat, glistening | No curd | 0.32 | Do. |
| B-9 | ----do---- | ----do---- | 0.19 | Non. |
| B-10 | Large, glistening; ragged border | Curd | 0.79 | Fast. |
| B-11 | Large, glistening; very ragged border | ----do---- | 0.68 | Do. |
| B-12 | Raised, glistening; slight border | ----do---- | 0.70 | Do. |
| B-13 | ----do---- | ----do---- | 0.74 | Do. |
| B-14 | Small, glistening | ----do---- | 0.77 | Do. |
| B-15 | Small glistening; etched border | No curd | 0.30 | Slow. |
| B-16 | Very small, glistening | Curd | 0.74 | Fast. |
| B-17 | Flat, fairly large, glistening | ----do---- | 0.71 | Do. |
| B-18 | Flat, glistening; slight irregular border | ----do---- | 0.60 | Moderate. |
| B-19 | ----do---- | ----do---- | 0.77 | Fast. |
| B-20 | Small, raised, glistening, etched | ----do---- | 0.41 | Slow. |

[1] 16 hr. incubations were made before titration.

Lyophiles of strains C-3, A-4, B-10, C-2, A-11, B-2, C-11, A-14, B-7, B-9, C-10, C-12 are opened and used to inoculate individual flasks of 100 ml. of 10% skim milk medium which has previously been sterilized at 10 lbs. steam pressure for 10 minutes. The flasks are incubated at 21° C. for 24 hours then 1 ml. of each is used to inoculate a second series of flasks containing 100 ml. of the same sterile medium. The second series is incubated at 21° C. for 24 hours then is used to inoculate (1 ml./100 ml.) a third series of flasks containing 100 ml. of the same sterile medium. After incubating the third series for 24 hours at 21° C., 0.1 ml. from each of the twelve flasks is transferred aseptically to 100 ml. of a sterile 10% skim milk solids medium. Ten ml. of this medium, which now contains all twelve strains, is used to inoculate each of three Roux bottles, each of which contains 1 liter of 10% skim milk solids medium which has been sterilized at 6 lbs. steam pressure for 10 minutes. The Roux bottles are incubated at 21° C. for 15 hours. The pH of the medium reaches a constant 4.6 and the percent acid, as lactic, rises to 0.82. The media are then freeze dried and the solid residue is stored in small tubes.

The culture which is obtained is eminently suitable for the preparation of Cheddar cheese, cottage cheese and buttermilk.

*Example II*

Lyophiles of strains C-3, A-4, B-10, A-11, C-11, B-7, C-2, B-9, C-10, A-14, B-2 and C-12 of Example I are each used to inoculate individual 100 ml. flasks of sterile 10% milk medium and the flasks are incubated at 21° C. for 24 hours. The flasks containing strains C-3, A-4, B-10, A-11, C-11, B-7, C-2 and B-9, after a 3 series transfer as described in Example I, are combined, 0.1 ml. of each added to 100 ml. of milk, and the combined strains are used to inoculate, at a rate of 10 ml./1000 ml., a sterile 10% milk medium in three Roux bottles. The flasks containing pure strains C-3, A-4, B-10, C-10, A-14, B-2, C-12 and B-9 after a 3-series transfer are combined and used to inoculate another set of 3 Roux bottles; both sets of Roux bottles are incubated for 16 hours at 21° C., and the products are isolated by freeze-drying.

The dry solids from the first set are milled and the culture is designated ATCC 14874; the dry solids from the second set are milled and the culture is designated ATCC 14875. They are, when propagated together, eminently suitable for the preparation of Cheddar cheese, cottage cheese and buttermilk.

Example III

Two grams each of the cultures of Example II designated ATCC 14874 and ATCC 14875 are aseptically transferred to 2000 ml. of a sterile (10 min. at 6 lbs. steam pressure) 14% reconstituted skim milk medium and the inoculum is incubated at 21° C. for 16 hours. Four ounces of the inoculum is then transferred aseptically to ten gallons of sweet, pasteurized (heated at 200° F. for 1 hour; cooled to 70° F.) milk and the starter solution is incubated at 20° C. for 16 hours.

The temperature of 1000 lbs. of pasteurized sweet milk is adjusted to 86–88° F. and 10 lbs. of the above-prepared lactic starter is added. The mixture is agitated to distribute the starter and the milk is allowed to ripen for one hour. At the end of this time, the temperature is adjusted to 88° F., if necessary. Three ounces of a cheesemaker's commercial rennet preparation, diluted with about five volumes of water is then added and dispersed in the milk. After uniform distribution of the rennet, agitation is stopped and the curd is watched for signs of coagulation and for the development of desired firmness; this requires about 25 to 30 minutes. At this stage the firmness of the curd may be tested by inserting a blunt instrument into it and raising it slowly, whereupon the curd splits ahead of the instrument. The curd is cut into cubes of desired size with curd knives and it is then stirred for 15 minutes. Heat is then applied through the vat jacket, increasing the temperature of the vat contents from about 87° F. to above about 100° F. to promote firming of the curd. This temperature increase requires about 30 minutes. The curd is stirred slowly during heating. The whey, which separates from the curd, is drained about 2.25 hours after the enzyme preparation has been added. After the whey has been drained, the curd is ditched and packed, then layered into slabs about six to seven inches wide. The slabs are turned at intervals of about every 10 minutes and are repiled in the conventional manner until the curd is ready for milling; about 5 turnings are required. The temperature of the curd at this stage is about 95° F.–100° F. The milled curd is spread evenly on the bottom of the vat and is salted with flake cheesemakers salt at the rate of 3 lbs. for each 1000 lbs. of milk. After the salt has dissolved well in the curd, 30 minutes, the curd is transferred to hoops and the filled hoops are placed in cheese presses. Cheese cloth bandages are used and the cheese is pressed for about 30 minutes. Following this, the cloth covering the cheese is adjusted and the cheese is put back into the press and given a final pressing for 24 hours. This final pressing smooths the surface of the cheese and compresses the entire block of cheese. The compressed forms of curd are dried for 4 days at 55° F. and then are coated with paraffin, are boxed, and are cured. After 30 days at 45° F., the cheese has very little flavor and body breakdown. Some mechanical openness is observed, but sample plugs taken from the cheese are free from gassiness, as evidenced by a lack of gas eyes or slits. Body breakdown and texture development progress with aging and, after about 90 days, the cheese remains free from off-flavors and mechanical defects in body. At this stage, the body of the cheese has become more pliable and waxy and a mild, desirably characteristic cheese flavor has developed.

Example IV

A lactic acid starter is prepared by propagating, in pasteurized sweet milk, the culture of Example I. The procedure employed is that of Example III substituting the culture of Example I for the corresponding cultures of Example II. A Cheddar cheese is prepared by the procedure of Example III substituting the starter solution prepared herein for the corresponding starter solution of Example III. The cheese which is obtained is of high quality and is substantially equivalent to that obtained as described in Example III.

Example V

Lyophiles of strains B–10, B–9, A–11, and C–11 of Example I are each used to inoculate individual 100 ml. flasks of sterile 10% milk medium and the flasks are incubated at 21° C. for 24 hours. After a 3 series transfer as described in Example I, the strains are combined by adding 0.1 ml. of each to 100 ml. of milk, and the combined strains are used to inoculate, at 10 ml./1000 ml., a sterile 10% milk solids medium in three Roux bottles. The bottles are incubated for 16 hours at 21° C. and the products are isolated by freeze-drying. The dry solids are milled and, when added to milk, form a starter which is eminently suitable for the preparation of Cheddar cheese, cottage cheese and buttermilk.

What is claimed is:

1. A process for the preparation of an improved cheese starter culture which comprises plating out multi-strain cheese-starter cultures, selecting from the strains separated thereby at least one rapid rate acid-former, at least one moderate rate acid-former, at least one slow rate acid-former and at least one non acid-former, inoculating a nutrient medium with said selected strains, incubating said inoculated medium until a peak state of viability is reached, and drying the medium to isolate said improved culture.

2. In a process for making cheese including a step in which a starter is used, the improvement which comprises using a starter comprised of a cheese starter culture prepared by the process of claim 1 and milk.

3. A process for the preparation of an improved cheese starter culture which comprising plating out a multi-strain cheese-starter culture, selecting from the strains separated thereby at least one rapid rate acid-former, at least one moderate rate acid-former, at least one slow rate acid-former and at least one non acid-former, separating said selected strains into two groups, inoculating two batches of nutrient medium each with one of said groups, incubating said batches of medium until a peak state of viability is reached and drying each said batch of medium.

4. In a process for making cheese including a step in which a starter is used, the improvement which comprises using as said starter a combined propagated culture comprised of cultures prepared by the process of claim 3 and milk.

References Cited in the file of this patent

UNITED STATES PATENTS 2,805,950    Erekson  ---------------- Sept. 10, 1957

OTHER REFERENCES

Gershenfeld: Bacteriology and Allied Subjects, Mack Publishing Company, Easton, Pa., 1945, pages 69, 70, and 77–79. (Copy in Div. 63.)

Czulak: Cheese Starter Research Problems, Dairy Research Section C.S.I.R.O., Melbourne, Australia, supplement to the Australian Journal of Dairy Technology, September 1959, pages 38–40. (Copy in Division 63.)